(No Model.) 2 Sheets—Sheet 1.
F. SCHELP, Jr.
CABLE GRIP.
No. 397,755. Patented Feb. 12, 1889.
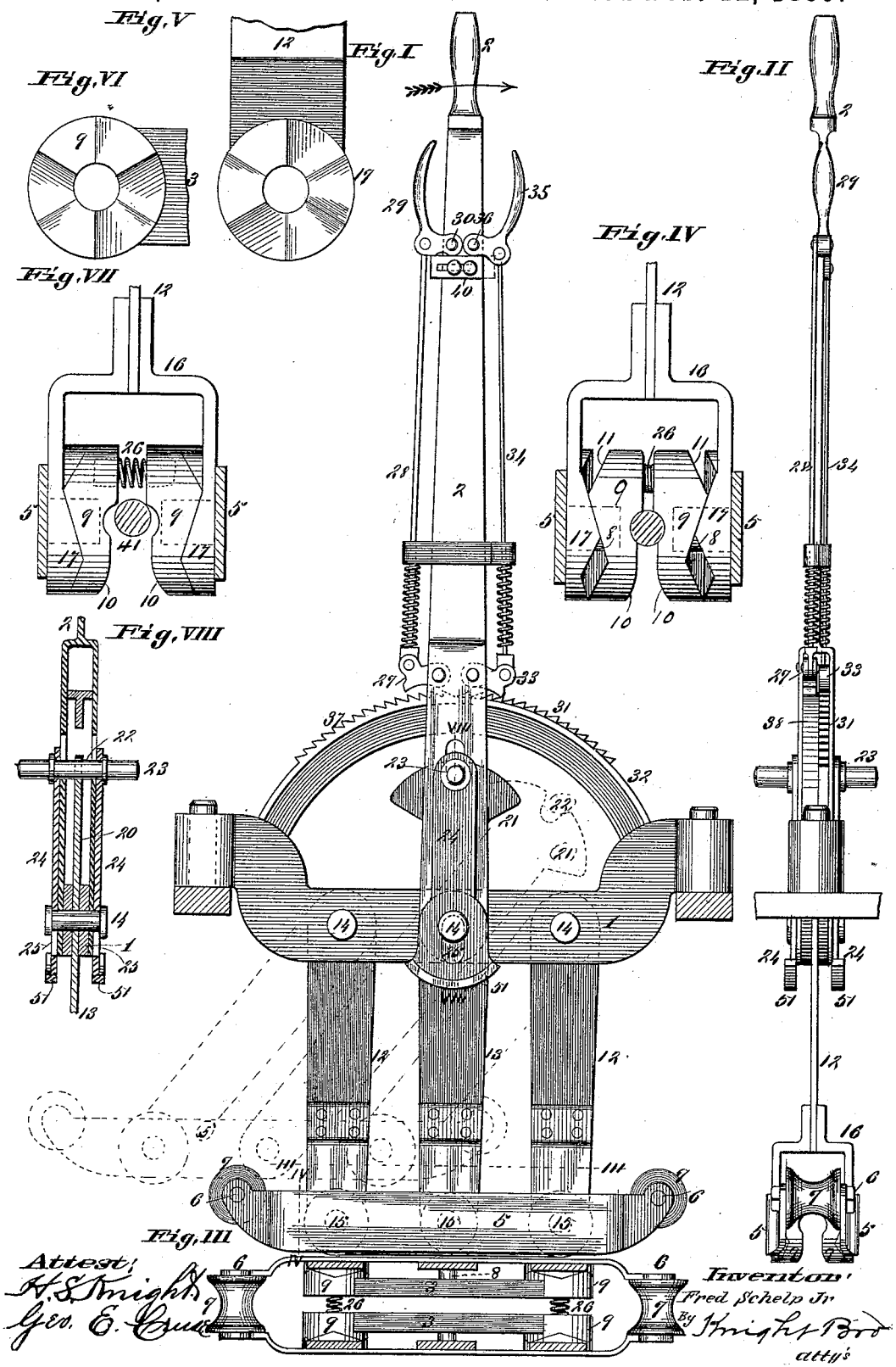

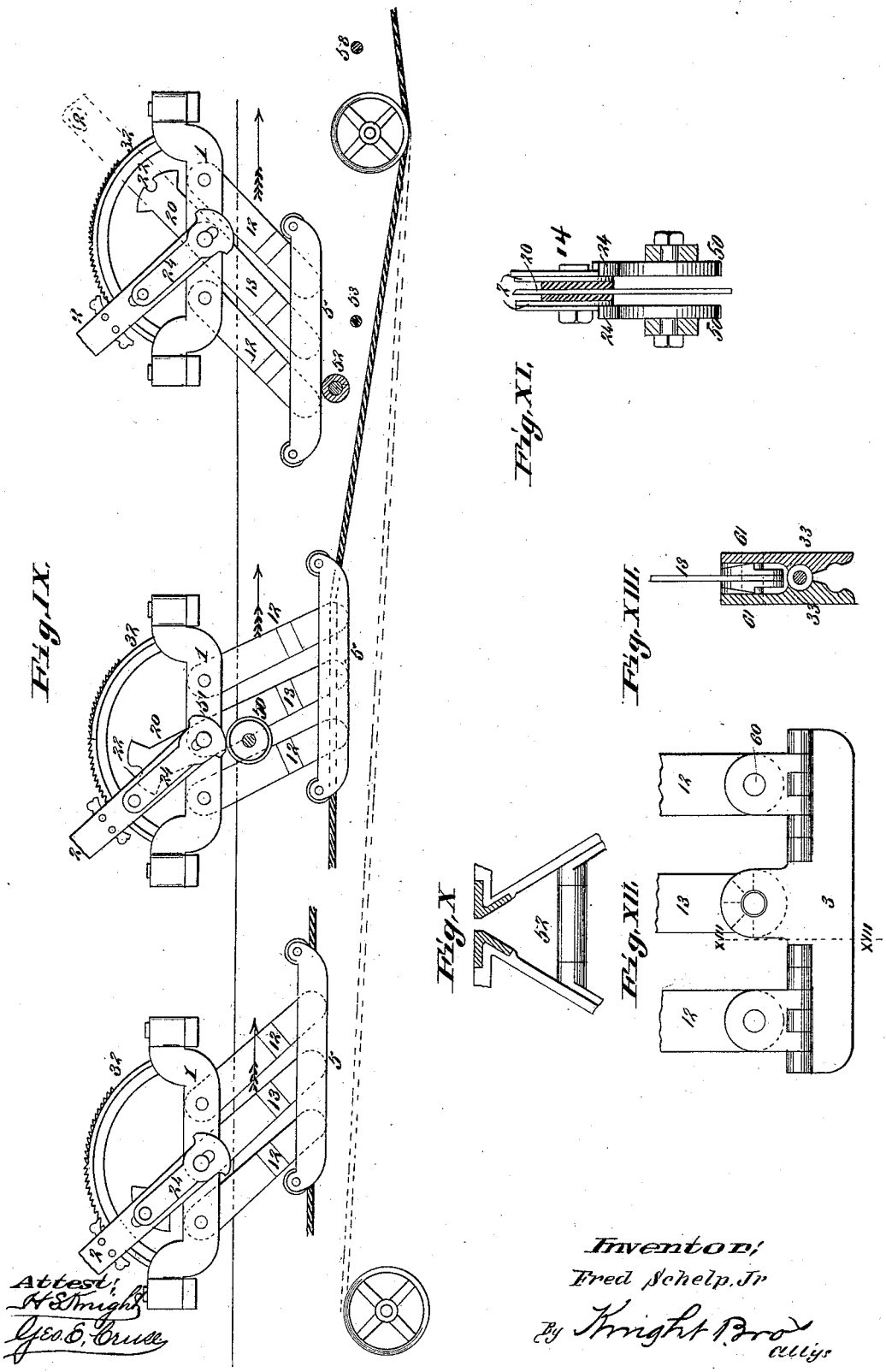

UNITED STATES PATENT OFFICE.

FRED SCHELP, JR., OF ST. LOUIS, MISSOURI.

CABLE-GRIP.

SPECIFICATION forming part of Letters Patent No. 397,755, dated February 12, 1889.

Application filed July 11, 1888. Serial No. 279,628. (No model.)

*To all whom it may concern:*

Be it known that I, FRED SCHELP, Jr., of the city of St. Louis, in the State of Missouri, have invented a certain new and useful Improvement in Cable-Grips, of which the following is a full, clear, and exact description, reference being had to the accompanying drawings, forming part of this specification, and in which—
Figure I is a side elevation of my improved grip, showing the jaws in full lines in their lower position and in dotted lines in their raised position. Fig. II is an edge view. Fig. III is a transverse horizontal section taken on line III III, Fig. I. Fig. IV is an enlarged section taken on line IV IV, Fig. I, and looking toward the body of the grip. Fig. V is an enlarged view of one of the cams secured to the parallel plates. Fig. VI is a similar view of one of the cams secured to the jaws. Fig. VII is an enlarged view showing the same parts as illustrated in Fig. IV, but showing the jaws open, while Fig. IV shows them closed. Fig. VIII is a detail vertical section taken on line VIII VIII, Fig. I. Fig. IX is a diagram showing a grip of my improved construction in three different positions and illustrating its operation. Fig. X is a transverse section through the upper portion of a conduit, showing the roller for raising or elevating the grip automatically. Fig. XI is a detail section through part of the frame of the grip, and showing the rollers in the conduit for raising the releasing mechanism.
Fig. XII is a side view showing a different form or manner of application of the cams to the jaws. Fig. XIII is a section taken on line XIII XIII, Fig. XII.

My invention relates to certain improvements in grips for cable railways; and my invention consists in features of novelty hereinafter fully described, and pointed out in the claims.

Referring to the drawings, 1 represents the main frame of the grip, and 2 the lever for operating the jaws.

3 represents the jaws, which are shown most plainly in Fig. III, and which would preferably be grooved to receive the cable.
They are located in and supported by a jaw-frame, 5, consisting preferably of two horizontal bars connected at their ends, as shown at 6, and at the point of connection they may be provided with grooved rollers 7, which bear upon the cable when the grip is in use. The jaws are connected to the frame 5 by means of pins 8, (see Figs. III and IV and dotted lines, Fig. VII,) each pin being connected to the frame 5 and projecting into recesses in the jaws, in which they fit loosely to permit the jaws to open and close in horizontal planes.

Secured to each jaw, preferably at each end, is a cam, 9, having preferably a number of inclined bearing-faces. (See Figs. II, IV, VI, and VII.) These cams are preferably made in the form of disks, which are flat on their inner faces, except being slightly rounded, as shown at 10, Figs. IV and VII, and their outer faces are provided with the inclined bearing-faces, as stated, and which I have indicated by the numeral 11 in Fig. IV.

The frame 5 is connected to the frame 1 by outer plates, 12, and an inner plate, 13. The plates are all pivoted to the frame 1 at 14, and are all pivoted to the frame 5 at 15. The plates are all bifurcated at their lower ends, as shown at 16, Figs. II, IV, and VII, and the forks on the lower ends fit within the frame 5, as shown clearly in Figs. IV and VII, and they are held within the frame by means of the pins 8, that connect the jaws to the frame, as already stated. On the lower ends or forks of these outer plates, 12, are cams 17, having preferably a number of inclined bearing-faces corresponding with the bearing-faces 11 of the cams 9. The cams 17 being thus pivoted to the frame 5, it will be understood that when they are turned upon these pivots they will force the cams 9 (and consequently the jaws 3, which are secured to the cams 9) inward, and thus the jaws are made to grasp the cable and hold it firmly between them. The cams 9 are turned upon their pivots by moving the frame 5 relatively to the frame 1 from the position shown in full lines, Fig. I, toward the position shown in dotted lines, or in the opposite direction—that is, to the right instead of the left—if desired. The frame 5 is thus moved by the lever 2.

The connection I prefer to use between the frame 5 and the lever 2 is as follows: 20 (see Fig. VIII) represents an extension of the plate 13 above the pivot 14. This extension (see Fig. I) is provided preferably with a head or enlargement, 21, and in its extreme upper end is a notch, 22. (See Fig. VIII and dotted line, Fig. I.) In this notch fits a pin, 23, which passes through links or plates 24 on the outside of the lever 2. The lever 2 is bifurcated at its lower end, as shown in Fig. VIII, so as to straddle the upper end, 20, of the plate 13, and it is within this fork that the pin 23 engages with the extension 20 of the plate 13. The links 24 are connected to the frame 1 by means of the same pivot-pin, 14, that connects the plate 13 to the frame, and they are provided with slots 25, which permit them to rise and fall for the purpose to be mentioned. It will thus be seen that when the lever 2 is moved—say in the direction indicated by the arrow, Fig. I—the frame 5, with the jaws and cams which it carries, will be moved from the position shown in full lines, Fig. I, toward the position shown in dotted lines, and when the lever is moved in the other direction the frame 5 and the parts it carries will be moved in the opposite direction, or to the right instead of to the left. As the frame 5 is thus moved, the cams 17 turn relatively to the cams 9, and force the cams 9 and the jaws 3, which they carry, inwardly, thus gripping the cable. As the lever is moved back, bringing the frame 5 to the position shown in full lines, Fig. I, the cams 9 and the jaws 3 are opened again by means of springs 26. (See Figs. I, IV, and VII.)

By the use of the plates 12 and 13, connecting the frame 5 to the frame 1, it will be seen that I secure a parallel movement to the frame 5, while at the same time it is permitted to rise and fall.

When moved in the direction indicated by the arrow, Fig. I, the lever is held to any position by means of a spring-pawl, 27, connected by a rod, 28, to a lever, 29, pivoted at 30 to the lever 2, the pawl engaging the teeth 31 of a rack or bar, 32, secured to the frame 1. When the lever is moved in the other direction, or to the left instead of the right, a spring-pawl, 33, connected by a rod, 34, to a lever, 35, pivoted at 36 to the lever 2, engages the teeth 37 of the rack or bar 32. To prevent the dog or pawl 33 from engaging the teeth 31, and to prevent the dog or pawl 27 from engaging the teeth 37, I pivot the two out of line, as shown in Fig. II, and cause the teeth 31 to cover but half of the surface of the rack or bar 32 on their side of the center of the rack, leaving a smooth surface, 38, over which the pawl 33 will ride, as the pawl 27 engages the teeth 31, and on the other side of the center of the rack I make the teeth 37 to cover but half of the surface of the rack or bar, so that the pawl 27 will have a smooth surface to bear upon, as the pawl 33 engages the teeth 37. In this way the lever may be operated or moved in either direction to grip the cable, so that when the car is going in reverse directions the gripman may always pull on the lever.

Instead of using the plain surface for the pawl not in use to ride upon, I may secure a sliding plate, 40, to the upper end of the lever 2 just beneath the pivot 30 36 of the levers 29 and 35. By moving this plate to the position shown in Fig. I the lever 29 is held up, and accordingly the pawl 27 is held out of engagement with the ratchet-teeth. By moving the plate back to the other position, as shown by dotted lines, Fig. I, the lever 35 and its pawl 33 will be held in an inoperative position.

The frame 5 is so situated relatively to the cable that when in the position shown in full lines in Fig. I the cable runs loosely through it and would occupy about such a position as is shown at 41, Fig. VII. Then as the frame 5 is raised and shifted by moving the plates 12 and 13 the jaws 3 are forced together by the cams 9 and 17, as stated, and the cable is gripped and held between them, as shown in Fig. IV.

As an automatic means of releasing the cable at crossings of other cable roads, I have illustrated in Fig. IX a mechanism that may be used in connection with my improved grip. This consists of a roller, 50, (or two of such rollers, see Figs. IX and XI,) situated in the upper part of the conduit, and against which the rounded lower ends, 51, of the links 24 strike. As they do so they are lifted or raised, and as they rise the pin 23 is moved upward out of engagement with the notch 22 of the upper end, 20, of the plate 13. This disconnects the plate 13 from the lever 2, and the first movement of the grip is to fall from the position shown on the left-hand side of Fig. IX to the position shown in the center of Fig. IX, and from this latter position the frame moves to a vertical position, or to the position shown in Fig. I, and thus releases the cable. As the car moves on under its momentum, the forward end of the frame 5 comes against a roller, 52, (see Figs. IX and X,) located within the conduit, and the frame 5 is forced to the position shown on the right-hand side of Fig. IX, and passes over the crossing cables 53 without injury to it or the cables. As soon as the car has passed a crossing the gripman moves his lever from the position shown in Fig. IX to the opposite side, or to the position shown in dotted lines on the right-hand side of Fig. IX, and the pin 23 engages again with the notch 22 on the extension 20 of the plate 13, and the frame 5 is moved back again, first taking a downward course to bring it into contact with the cable, then moving upward and grasping the cable, as already described.

Should it ever be desirable to disengage the lever 2 from the extension 20 of the plate 13 by hand or foot, it may be done by taking hold of the extended ends of the pin 23 (see Fig. VIII) and lifting it out of the notch 22, the plates 24 allowing the pin to be lifted out by the pin 14 moving in the slots 25.

In Figs. XII and XIII, I have shown a somewhat different form of constructing the gripping-jaws 3, they being hinged together in this case and pivoted at 60 to the plates 12, and instead of the cams 9 and 17 being located between the plates 12 and the frame 5, they are located between the plate 13 and the extended upper ends, 61, of the jaws 3.

I claim as my invention—

1. In a cable-grip, plates pivoted to the main frame carrying the jaws, and allowing the same to swing parallel with the main frame and cable to close the jaws and grip the cable, substantially as set forth.

2. In a cable-grip, the jaws and means for operating said jaws, having duplicate pivoted inclined cams moving upon each other, and thereby closing the jaws and grasping the cable.

3. In a cable-grip, the combination of the main frame, jaws, a frame in which the jaws are located, plates pivoted at their upper ends to the main frame and at their lower ends to the jaw-frame, cams on the plates and jaws, respectively, and a lever for moving the jaw-frame, substantially as and for the purpose set forth.

4. In a cable-grip, the combination of the main frame, jaws, a frame to which the jaws are pivoted, plates pivoted to the main frame at their upper ends and to the jaw-frame at their lower ends, cams having a number of inclined faces secured to the jaws, cams having a number of inclined faces secured to the plates, and a lever for moving the jaw-frame, substantially as and for the purpose set forth.

5. In a cable-grip, the combination of the main frame, jaws, a frame to which the jaws are secured, links pivoted at their upper ends to the main frame and at their lower ends to the jaw-frame, cams secured to said jaws and links, respectively, a central plate pivoted to the main frame and to the jaw-frame, and a lever engaging said central plate, substantially as and for the purpose set forth.

6. In a cable-grip, the combination of the main frame, jaws, a frame to which the jaws are secured, outer plates pivoting the main frame to the jaw-frame, cams on the jaws and said outer plates, respectively, a central plate pivoted to the jaw-frame and to the main frame, an extension on said central plate, and a lever pivoted to the main frame and engaging the extension of the central plate, substantially as and for the purpose set forth.

7. In a cable-grip, the combination of the main frame, jaws, a frame to which the jaws are secured, pivoted plates connecting the frames together, an extension on one of said plates, and a lever engaging said extension, substantially as and for the purpose set forth.

8. In a cable-grip, the combination of the main frame, jaws, a frame to which the jaws are secured, links connecting said frames, a notched extension on one of the links, a lever pivoted to the main frame, and a movable pin on the lever engaging the notch of the extension, substantially as and for the purpose set forth.

9. In a cable-grip, the combination of the main frame, jaws, a frame carrying said jaws, plates pivoted to the main frame and to the jaw-frame, and an extension on one of said plates forming part of an operating-lever for moving the jaws, substantially as set forth.

10. In a cable-grip, the combination of the main frame, jaws, a frame to which the jaws are secured, plates connecting the frames together, a notched extension on one of the plates, a pin engaging said notch, and links secured to the pin, said links being adapted to bear against an obstruction and raise the said pin out of the said notch to automatically disconnect the lever, substantially as and for the purpose set forth.

11. In a cable-grip, the combination of the main frame, jaws, a frame in which the jaws are located, plates pivoting the main frame to the jaws, a lever for operating said jaws, and an obstruction, 52, for throwing the jaws in an upward direction, substantially as and for the purpose set forth.

12. In a cable-grip, the combination of the main frame, jaws, connection between the jaws and main frame, an operating-lever provided with pawls, and a rack or bar having a toothed and a plain or smooth surface on each side of the center, substantially as and for the purpose set forth.

13. In a detachable cable-grip, the vertically-moving link adapted to be raised by an obstruction in the road, and thereby automatically detaching the lever from its connection, and an extension pivoted to the main frame and connected to the lever, substantially as set forth.

14. In a cable-grip, the combination of the jaws, a detachable lever for operating the jaws, and links 24 for coming against an obstruction and disconnecting said lever, substantially as and for the purpose set forth.

FRED SCHELP, JR.

In presence of—
GEO. H. KNIGHT,
JOS. WAHLE.